H. SIEBEN.
LAWN SPRINKLING DEVICE.
APPLICATION FILED FEB. 3, 1917.
1,278,236.
Patented Sept. 10, 1918.
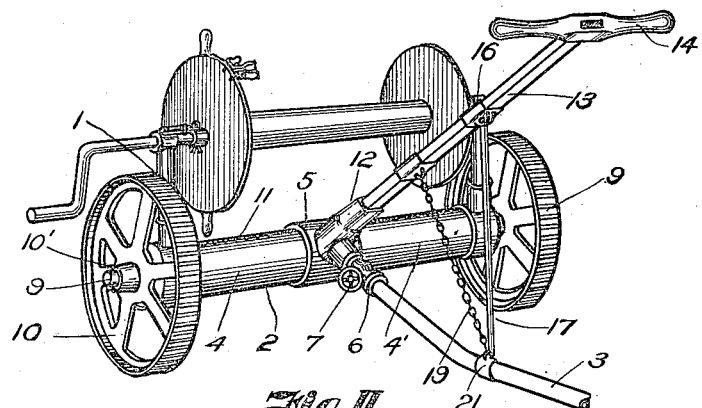
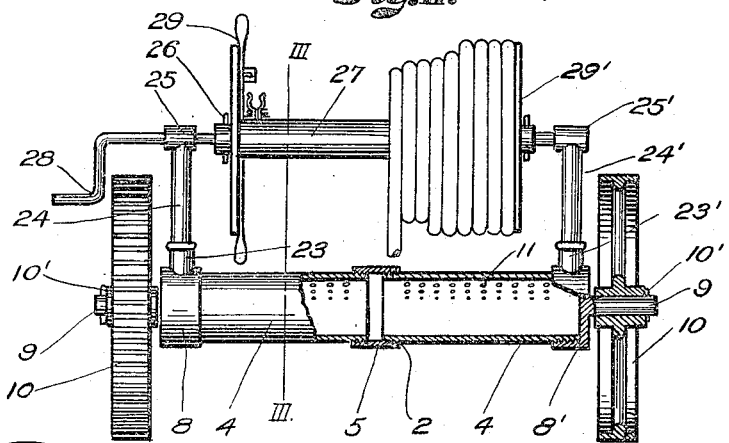
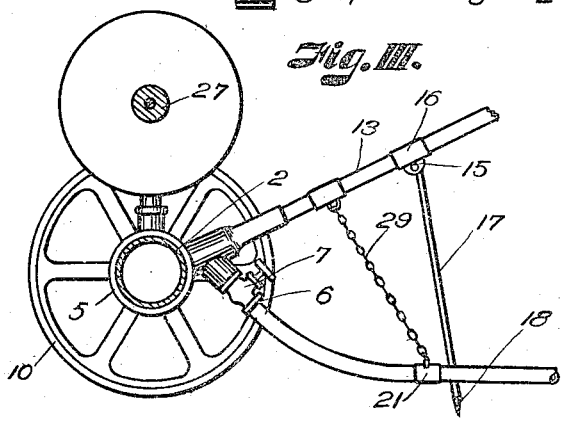
INVENTOR.
Henry Sieben.
BY
ATTORNEY

UNITED STATES PATENT OFFICE.

HENRY SIEBEN, OF KANSAS CITY, MISSOURI.

LAWN-SPRINKLING DEVICE.

1,278,236.

Specification of Letters Patent.   Patented Sept. 10, 1918.

Application filed February 3, 1917.   Serial No. 146,378.

*To all whom it may concern:*

Be it known that I, HENRY SIEBEN, a citizen of the United States, residing at Kansas City, in the county of Jackson and State of Missouri, have invented certain new and useful Improvements in Lawn-Sprinkling Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to lawn sprinkling devices and has for its principal object to provide a device of this character that may be easily moved about and from which the spray may be thrown at a desired elevation and direction.

A further object of the invention is to provide means on the sprinkler on which a hose may be wound and carried when the sprinkler is not in use.

In accomplishing these objects I have provided improved details of structure the preferred form of which is illustrated in the accompanying drawings, wherein:—

Figure I is a perspective view of a sprinkling device constructed according to my invention.

Fig. II is an end view of the same, a part of the spray barrel being broken away for better illustration.

Fig. III is a vertical section on the line III—III, Fig. II.

Referring more in detail to the drawings:—

1 designates a lawn sprinkling device embodying my invention, which comprises a horizontally disposed barrel 2, into which water may be delivered through a hose 3. The barrel 2 comprises separate cylindrical sections 4 and 4', which are threaded into a central collar 5, having a hose coupling 6 therein, and a valve 7 by which water from the hose may be admitted to the barrel, the sections closed at their outer ends by caps 8—8', which are threaded onto their respective sections.

Each of the caps 8—8' is provided with an extended spindle 9 on which wheels 10 are mounted for carrying the spray barrel and reel parts, presently described, the wheels being retained on the spindles by means of keys 10' which project through the spindles near their outer ends.

The cylinders 4—4' are each provided with a plurality of forwardly and upwardly opening ports 11 through which water delivered into the barrel from the hose may be sprayed.

Integrally formed with the collar 5 and opening rearwardly and upwardly therefrom is a socket 12 into which a handle 13 is projected and by which the device is guided or pushed about; the handle having a cross arm 14 at its outer end to facilitate handling of the device.

Pivotally suspended from between ears 15 of a collar 16 that encircles and is fastened to the handle 13 is a rod 17, having a pointed end 18 which is adapted for projection into the ground to hold the handle elevated in a desired position to give the proper elevation to the spray streams; it being apparent by raising or lowering the handle the barrel 2 will be revolved to correspondingly lower or raise the spray.

Also fastened to the handle 13 is a chain 19 carrying at its end a collar 21, which may be fastened about the hose 3 adjacent the coupling, so that when moving the device about, the pull on the hose will be taken up by the chain instead of kinking and wearing the hose at the coupling 6.

Integrally formed within the end collars 8—8' are sockets 23, which carry standards 24—24', having end bearings 25—25', which revolubly carry a hose reel 26; the said reel comprising a cross shaft 27, having a crank 28, whereby it may be rotated, and having spaced guides 29—29' between which the hose may be wound on the shaft.

Presuming the device to be so constructed, a hose may be attached to the coupling 6 and water admitted to the spray barrel by opening the valve 7. Water delivered into the barrel under pressure will be sprayed therefrom through the ports 11 and the direction and elevation of the spray regulated by properly turning the device and by raising or lowering the handle 13 and inserting the rod in the ground to hold the handle at the desired position.

By reason of its mounting on the ground wheels, the device may be easily moved from one position to another on a lawn, so that when one portion of the lawn has been sprayed the device may be moved to spray another portion.

After spraying, the hose is removed from the coupling 6 and fastened to the reel and wound thereon by turning the crank.

It is apparent that with my improvements a convenient and serviceable device is provided which is easily operated and from which a spray may be thrown at any desired elevation.

Having thus described my invention what I claim as new therein, and desire to secure by Letters-Patent, is:—

1. A sprinkling device comprising a horizontally disposed barrel having upwardly and forwardly opening ports therein, spindles fixed to the opposite ends of said barrel, ground wheels revolubly mounted on said spindles, a valve fitting interposed in the barrel having a socketed portion for receiving a handle and having a coupling for receiving a hose whereby water may be delivered into the barrel, a handle mounted in the socketed portion of said fitting and a supporting rod pivotally fixed to said handle whereby the latter may be supported to discharge a spray from the barrel in a desired direction.

2. A sprinkling device comprising a spray barrel, comprising a central coupling, cylindrical sections threaded into said coupling, a cap threaded onto the outer ends of said cylinders, a spindle extending from each of said caps, wheels mounted on said spindles, a valve formed within said coupling, opening into said barrel and having a coupling for receiving a hose, whereby water may be admitted to the barrel, a socket in said coupling, a rearwardly extended handle mounted in said socket, and a supporting rod pivotally suspended from said handle.

3. In a sprinkling device, the combination with a horizontally disposed spray balrel, having ports opening upwardly therefrom, spindles extending from the ends of said barrel and wheels mounted on said spindles, of a reel comprising spaced standards mounted on said spray barrel, a horizontal shaft carried by said standards, and a crank on said shaft, for the purpose set forth.

4. In a sprinkling device, the combination with a horizontally disposed spray barrel, having ports opening upwardly and forwardly therefrom, end caps threaded onto said barrel, spindles extending from said caps, and wheels mounted on said spindles, of a hose reel comprising standards, mounted on said barrel caps and having end bearings, a horizontal shaft carried in said bearings, spaced guides on said shaft, and a crank for revolving said shaft to wind a hose thereon.

In testimony whereof I affix my signature.

HENRY SIEBEN.

Copies of this patent may be obtained for five cents each, by addressing the "Commissioner of Patents, Washington, D. C."